(12) United States Patent
Boon et al.

(10) Patent No.: US 11,680,891 B2
(45) Date of Patent: Jun. 20, 2023

(54) DEVICE AND METHOD FOR DETECTING CORROSION OF A METAL PART

(71) Applicant: Rayong Engineering and Plant Service Co., Ltd., Bangkok (TH)

(72) Inventors: Heh Kok Boon, Singapore (SG);
Pongpat Lortrakul, Bangkok (TH);
Chayathorn Chuenmuneewong, Surin (TH); Wee Keng Lay, Singapore (SG);
Lim Eng Seng, Singapore (SG);
Cheong Siah Chong, Singapore (SG)

(73) Assignee: Rayong Engineering and Plant Service Co., Ltd.

( * ) Notice: Subject to any disclaimer, the term of this patent is extended or adjusted under 35 U.S.C. 154(b) by 757 days.

(21) Appl. No.: 16/670,363

(22) Filed: Oct. 31, 2019

(65) Prior Publication Data
US 2020/0141861 A1 May 7, 2020

(30) Foreign Application Priority Data

Nov. 1, 2018 (SG) .............................. 10201809733T (51) Int. Cl.
*G01N 17/04* (2006.01)
(52) U.S. Cl.
CPC .................................... *G01N 17/04* (2013.01)
(58) Field of Classification Search
CPC .... G01N 17/00; G01N 17/002; G01N 17/006; G01N 17/008; G01N 17/02; G01N 17/043; G01N 17/046; G01N 17/04
See application file for complete search history.

(56) References Cited

U.S. PATENT DOCUMENTS

| | | |
|---|---|---|
| 4,271,120 A | 6/1981 | Michaud |
| 5,127,433 A | 7/1992 | Argyle et al. |

(Continued)

FOREIGN PATENT DOCUMENTS

SG  10201609261X  6/2017

OTHER PUBLICATIONS

Patent document SG10201609261X (Year: 2017).*

*Primary Examiner* — Gurpreet Kaur
(74) *Attorney, Agent, or Firm* — Harness, Dickey & Pierce, P.L.C.

(57) ABSTRACT

The present invention relates to a device for detecting corrosion of a metal part comprising a housing which is a hollow cylinder comprising a proximal end located proximate to the metal part upon installation of the device, and a distal end located away from the metal part upon installation of the device, a display having at least a part which is located inside the housing, a spring located inside the housing in a compressed manner, pushing the display outwardly and a sensor located in a manner that associates the housing with the display, comprising a corroded portion located outside the housing. According to this invention, the corroded portion of the sensor has a diameter in a range of 0.6 to 1.5 mm. Further, the present invention relates to a method for detecting corrosion of a metal part comprising installing the device according to this invention to the metal part. This invention provides advantages that the design of the sensor allows accuracy in the detection of the metal part corrosion, the design of the display gives a reliable operation, e.g. the display will not be interrupted when the sensor is broken, the installation of the device to the metal part can be performed conveniently and quickly in multi-directions, and it is possible and convenient to detach/re-attach the device from the (Continued)

installation in case the inspector needs to inspect the physical aspects of the device.

25 Claims, 10 Drawing Sheets

(56) References Cited

U.S. PATENT DOCUMENTS

| | | | |
|---|---|---|---|
| 5,181,536 A * | 1/1993 | Argyle | G01N 17/00 73/86 |
| 8,810,264 B2 | 8/2014 | Bohon et al. | |
| 2014/0007662 A1 | 1/2014 | Powell | |

* cited by examiner

DEVICE AND METHOD FOR DETECTING CORROSION OF A METAL PART

CROSS-REFERENCE TO RELATED APPLICATIONS

This application claims the benefit of Singapore Application No. 10201809733T, filed Nov. 1, 2018. The entire disclosures of the above application are incorporated herein by reference.

FIELD OF THE INVENTION

The present invention relates to an engineering of a device and method for detecting corrosion of a metal part.

BACKGROUND OF THE INVENTION

Many industries, in particular the petrochemical industry, use a large number of metal parts, for example, in pipework, most of which are made of metal. After a certain period of use, these metal parts usually corrode as a result, for examples, of water and humidity. In the case of general iron pipes, corrosion can be visually observed, and maintenance can be planned accordingly. However, because some parts of the pipework are insulated, corrosion of pipes within the insulation is not visible.

The inventor has conducted a search for prior arts related to devices and methods for detecting corrosion of metal parts and found prior arts, such as the followings:

The U.S. Pat. No. 4,271,120 discloses a device to detect and indicate corrosive fluids in insulation for pipes of heavy water plants. The device is composed of a housing, the inside of which is equipped with a primary indicator, a secondary indicator, a corrodible link, and a compression spring. One end of the corrodible link is anchored to the secondary indicator, and the other end of the corrodible link is anchored to the wall at the end of the housing in order to pull the spring in a compressed condition. When there is corrosive fluid in the pipe insulation, the corrodible link will be corroded and break, which results in the spring losing its tension and pushing the secondary indicator. After that, the secondary indicator will push the primary indicator, which is characterized by a reel of thread wrapped in cloth, out of the housing. Nevertheless, the aforementioned detecting device has certain disadvantages. That is, the corrodible link is not placed near and/or in the same condition as the metal pipe, because the said device cannot be installed in such a way that the corrodible link is near the metal pipe. In addition, the corrosive fluid may remain inside the said device, which leads the corrodible link and spring to be immersed in the corrosive fluid. The fact that the spring is in the same condition as the corrodible link may allow the spring to break and be corroded, which can lead to errors of the device's functioning.

The U.S. Pat. No. 8,810,264 B2 discloses a device for sensing corrosion under insulation, which comprises a base, at least one corrosion-test circuit mounted to the base and comprising a first conductor; a second conductor and a testing element extending between the first conductor and the second conductor, and a reference circuit mounted to the base. The said patent also discloses a method for sensing corrosion under insulation, which comprises positioning the device for sensing corrosion under insulation radially adjacent an outer surface of the pipe, exposing the testing element to the same environment as the outer surface of the pipe, and determining whether the testing element has been corroded by measuring and comparing the resistance across the testing element with a reference element. If the measured value is high, this indicates that the test element suffers from corrosion, which in turn also indicates that the pipe experiences corrosion. Nonetheless, this device and its method have some disadvantages, for examples, complexity of the device, difficulty in operating, and a high cost.

The Singaporean Patent Publication No. 10201609261X (A) discloses a corrosion detection device, which comprises a housing, a display arranged at one end of the housing, a spring arranged in compression within the housing and having one end pressed on the display, and a sensor arranged within the housing. The said invention, the corrosion detection device is provided with a compartment that allows a part of the sensor to be near and/or in the same condition as metal parts and allows the spring not to be near and/or in the same condition as the metal parts, in such a way that, when the sensor is corroded and breaks related to the degree of corrosion of the metal parts, the display continues function and indicates the metal parts having experienced corrosion However, said device does not specify the proper configuration and installation of the sensor.

The prior arts described above are intended to provide devices for detecting corrosion with different characteristics. However, there is no prior art disclosure of a device and method that can solve the aforementioned problems.

SUMMARY OF THE INVENTION

In one embodiment, the present invention relates to a device for detecting corrosion of a metal part comprising a housing which is a hollow cylinder comprising a proximal end located proximate to the metal part upon installation of the device, and a distal end located away from the metal part upon installation of the device, a display having at least a part which is located inside the housing, a spring located inside the housing in a compressed manner, pushing the display outwardly and a sensor located in a manner that associates the housing with the display, comprising a corroded portion located outside the housing. According to this invention, the corroded portion of the sensor has a diameter in a range of 0.6 to 1.5 mm.

In another embodiment of the present invention, it relates to a method for detecting corrosion of a metal part comprising installing a device comprising a housing which is a hollow cylinder comprising a proximal end located proximate to the metal part upon installation of the device, and a distal end located away from the metal part upon installation of the device, a display having at least a part which is located inside the housing, a spring located inside the housing in a compressed manner, pushing the display outwardly, and a sensor located in a manner that associates the housing with the display, comprising a corroded portion. The corroded portion is located outside the housing, and in a same condition with the metal part. Furthermore, the corroded portion of the sensor has a diameter in a range of 0.6 to 1.5 mm.

It is an object of the present invention to provide a device and method for detecting corrosion with specific features and several advantages, such as:
  the design of the sensor allows accuracy in the detection of the metal part corrosion,
  the design of the display gives a reliable operation, e.g. the display will not be interrupted when the sensor is broken, the design makes it is possible to install additional devices, such as a light or electronic wireless to facilitate the corrosion detection, the installation of the device to the metal part can be performed conveniently and quickly in multi-directions, it is possible and convenient to detach/re-attach the device from the installation in case the inspector needs to inspect the physical aspects of the device.

DETAILED DESCRIPTION OF THE INVENTION

The characteristics and additional advantages of the present invention will become more obvious from the following details in reference to the accompanying FIGS. 1-15.

The device for detecting corrosion of a metal part according to this invention comprises a housing (1) which is a hollow cylinder comprising a proximal end (1.1) located proximate to the metal part upon installation of the device, and a distal end (1.2) located away from the metal part upon installation of the device, a display (2) having at least a part which is located inside the housing (1), a spring (3) located inside the housing (1) in a compressed manner, pushing the display (2) outwardly; and a sensor (4) located in a manner that associates the housing (1) with the display (2), comprising a corroded portion (4.1) located outside the housing (1). The corroded portion (4.1) of the sensor (4) has a diameter in a range of 0.6 to 1.5 mm. Preferably, the corroded portion (4.1) has the diameter in a range of 0.7 to 1.4 mm., more preferably in a range of 0.8 to 1.3 mm., even more preferably in a range of 0.9 to 1.2 mm. and most preferably in a range of 0.9 to 1.1 mm.

According to the present invention, the corroded portion (4.1) of the sensor (4) has a length in a range of 1 to 30 mm., preferably in a range of 1 to 15 mm., more preferably in a range of 2 to 10 mm., even more preferably in a range of 2 to 5 mm., and most preferably in a range of 2 to 4 mm.

According to the present invention, the corroded portion (4.1) of the sensor (4) is positioned in a range of 4 to 8 mm. away from the proximal end (1.1) of the housing (1) or a plane of an external surface of the housing (1) that closes to the metal part. Preferably, the corroded portion (4.1) is positioned in a range of 5 to 7 mm., more preferably 6 mm. away from the proximal end (1.1) of the housing (1) or a plane of an external surface of the housing (1) that closes to the metal part.

According to the above embodiment, the diameter and the length of the corroded portion (4.1) of the sensor (4) and the distance between the corroded portion (4.1) and the proximal end (1.1) of the housing (1) or a plane of an external surface of the housing (1) that closes to the metal part are determined properly so that the sensor (4) has a corrosion rate that corresponds to the corrosion of the metal part. Therefore, when the corrosion rates correspond, the sensor (4) will accurately indicate the corrosion of the metal part.

Figure 4:
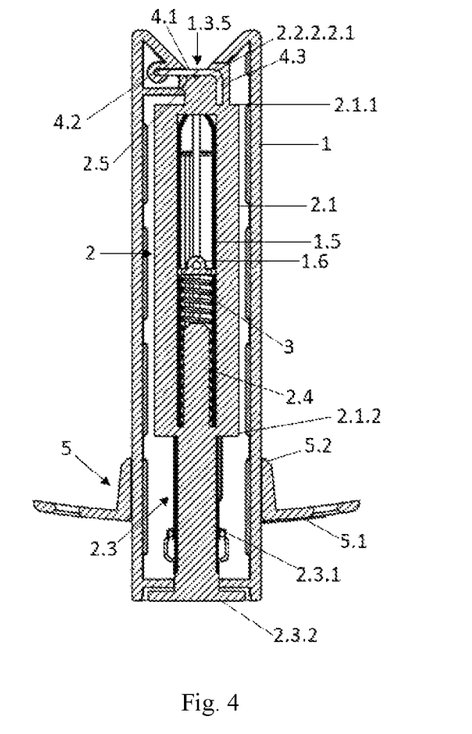
FIG. 4 is a longitudinal section of the device according to first embodiment of the present invention.
Figure 10:
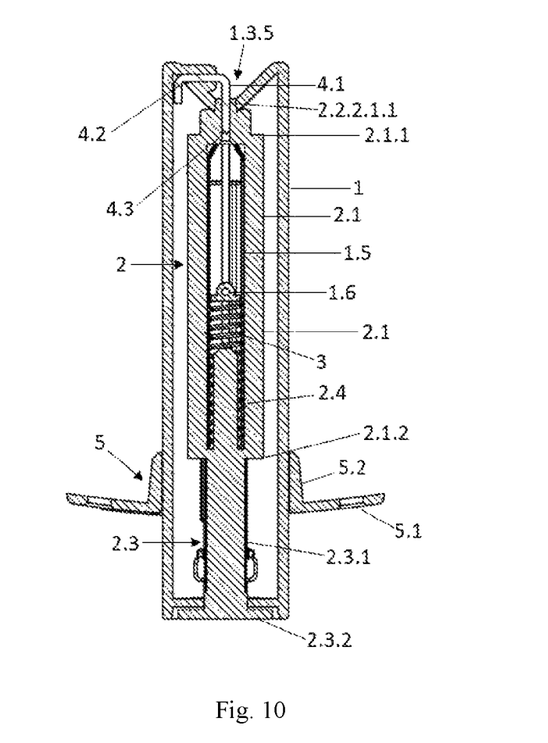
FIG. 10 is a longitudinal section of the device according to second embodiment of the present invention.
Figure 14:
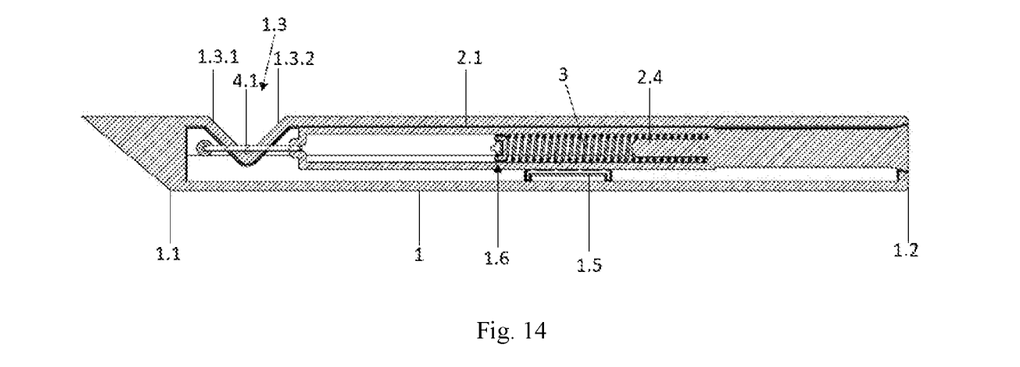
FIG. 14 is a longitudinal section of the device according to third embodiment of the present invention.

According to the present invention, as clearly shown in FIGS. 4, 10 and 14, the sensor (4) further comprises a first end (4.2) attached to the housing (1) and a second end (4.3) attached to the display (2) in a manner that the display (2) being attached in an initial position inside the housing (1) upon installation of the device and is at least partially pushed out of the housing (1) when the corroded portion (4.1) of the sensor (4) is corroded until it is weakened or broken.

In the first embodiment, the corroded portion (4.1) of the sensor (4) is placed transverse to a longitudinal axis of the housing (1). Alternatively, in the second embodiment, the corroded portion (4.1) of the sensor (4) is placed in a same direction as the longitudinal axis of the housing (1).

According to the above embodiments, the arrangement of the corroded portion (4.1) which can be either transverse or longitudinal provides an advantage, that is, the design of the device can be adjusted to make it suitable for the metal part to be inspected, i.e. the device for detecting corrosion of a metal part can be designed to be insertable along the direction perpendicular or parallel to the direction of the tangent line of the metal part.

Referring now to FIGS. 1, 2, 7 and 14, the housing (1) further comprises a concave portion (1.3) being formed of a first extending portion (1.3.1) and a second extending portion (1.3.2) which extend downwardly and converge each other to form the concave portion (1.3) from the proximal end (1.1) or from the side wall of the housing (1) for supporting the corroded portion (4.1) of the sensor (4) and an opening hole (1.4) located at the distal end (1.2). The concave portion (1.3) of this invention can be in any shape such as semi-circle, triangle or rectangle.

As shown in FIGS. 2, 3, 8 and 9, the housing (1) further comprises at least two movement controlling portions (1.5) which are located opposite to each other, each having at least two ridges extending longitudinally from an internal surface of the housing (1), and an abutting portion (1.6) including a receiving portion (1.6.1) located at the internal surface of the housing (1) and a bar (1.6.2) located opposite to the receiving portion (1.6.1) extending from the internal surface of the housing (1) to the receiving portion (1.6.1) for supporting the pushing of the spring (3).

Figure 5:
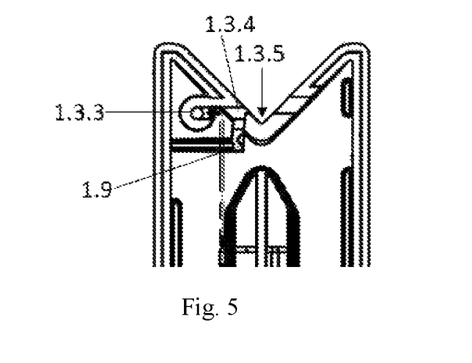
FIG. 5 is a partially longitudinal section of the housing of the device according to first embodiment of the present invention.
Figure 11:
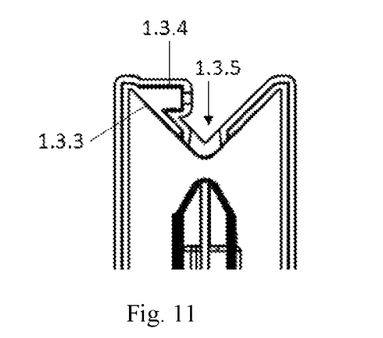
FIG. 11 is a partially longitudinal section of the housing of the device according to second embodiment of the present invention.

FIGS. 5 and 11 show preferred embodiments of the present invention where the concave portion (1.3) further comprises a fastening hole (1.3.3) provided to be attached to the sensor (4), an inserted portion (1.3.4) located at the first extending portion (1.3.1) to allow the corroded portion (4.1) of the sensor (4) to come outside, and an opening (1.3.5) located at a lower side of the concave portion (1.3) for supporting an end of the display (2).

According to this invention, the inserted portion (1.3.4) can be a hole located at the first extending portion (1.3.1) as shown in FIG. 5, or a hollow protrusion extending horizontally from the first extending portion (1.3.1) as shown in FIG. 11. The hole is suitable for the sensor (4) to extend and extend further along the horizontal line, while the hollow protrusion is suitable for the sensor (4) to extend and change its direction so that it extends vertically.

Figure 1:
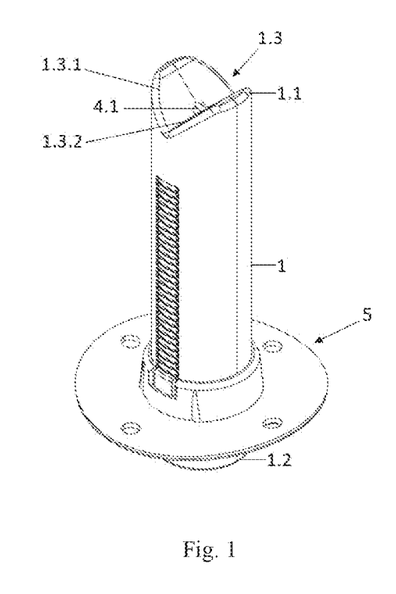
FIG. 1 is a perspective view of the device according to first embodiment of the present invention.
Figure 2:
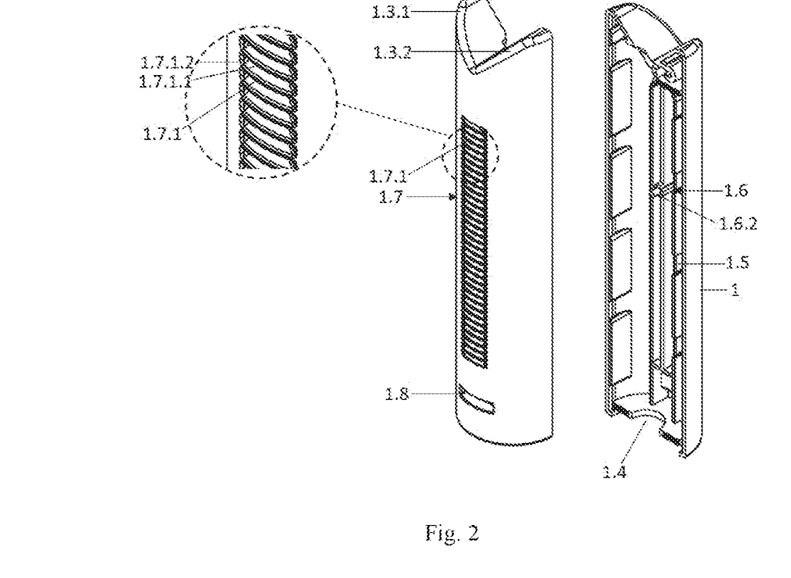
FIG. 2 is a perspective exploded view of the housing of the device according to first embodiment of the present invention.
Figure 3:
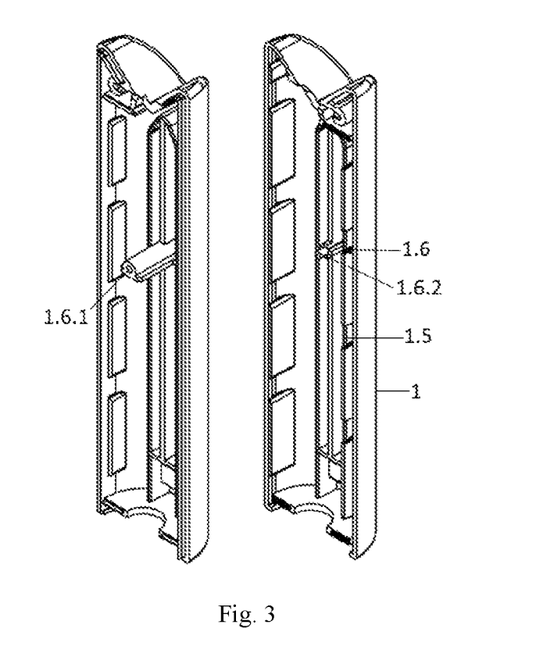
FIG. 3 is a perspective exploded view of the housing of the device according to first embodiment of the present invention.
Figure 8:
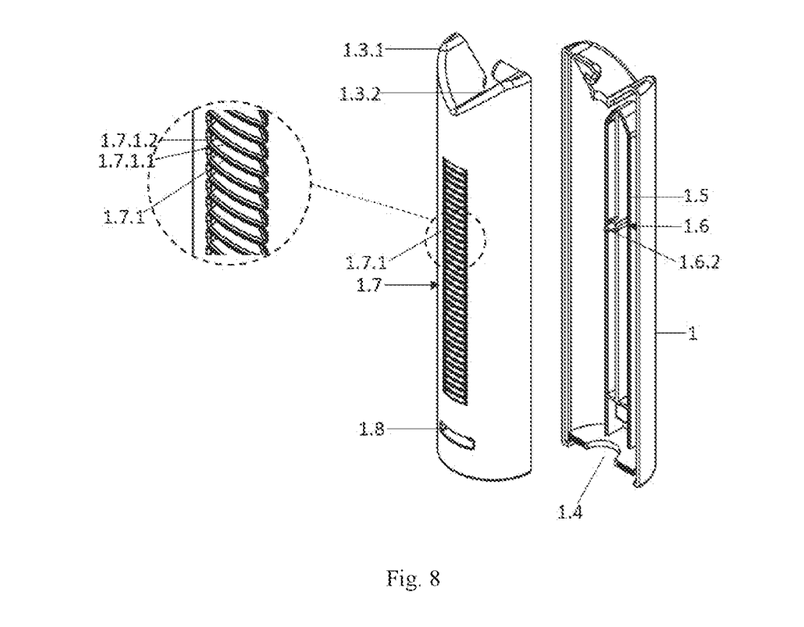
FIG. 8 is a perspective exploded view of the housing of the device according to second embodiment of the present invention.
Figure 9:
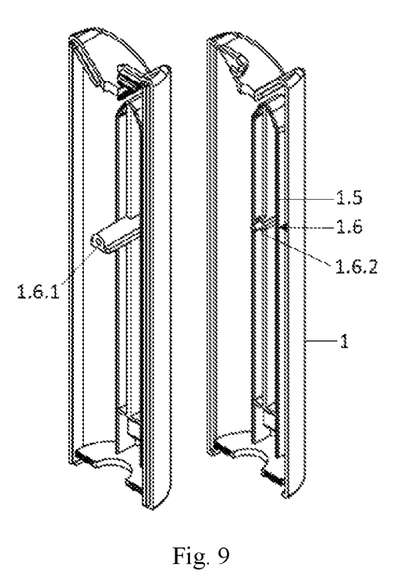
FIG. 9 is a perspective exploded view of the housing of the device according to second embodiment of the present invention.

According to the present invention, as clearly shown in FIGS. 2 and 8, the housing (1) further comprises a locking bar (1.7), which comprises a plurality of locking slits (1.7.1) located at an external surface of the housing (1), with a first inclined portion (1.7.1.1) inclined downwardly toward the distal end (1.2) of the housing (1) and a second inclined portion (1.7.1.2) inclined toward a lateral side of the locking slits (1.7.1).

Alternatively, as shown in FIGS. 2 and 8, the housing (1) may comprise a cavity (1.8) located on the external surface of the housing (1) for accommodating an external accessory. The external accessory may be, for example, a light or electronic wireless.

Figure 6:
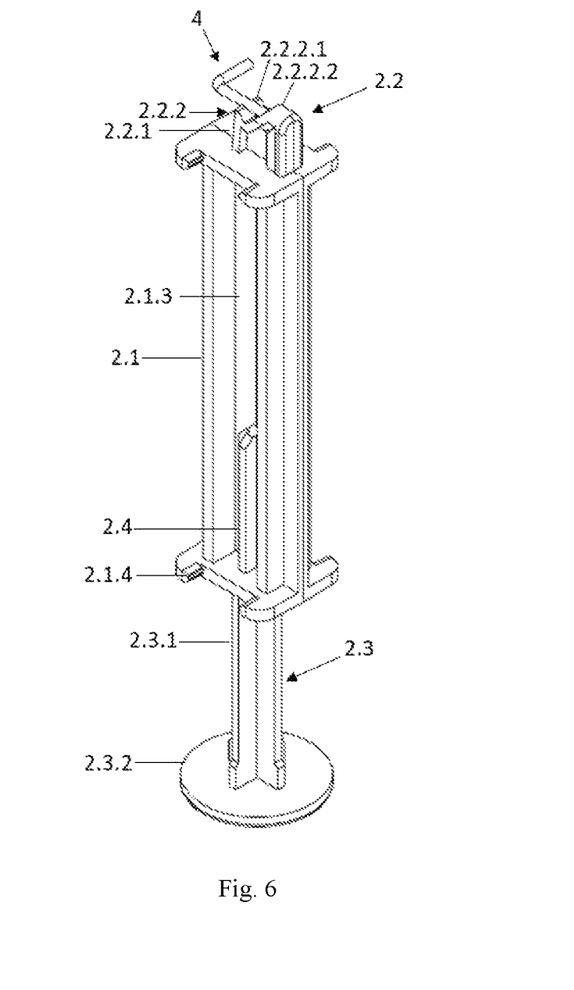
FIG. 6 is a perspective view of the display of the device according to first embodiment of the present invention.
Figure 7:
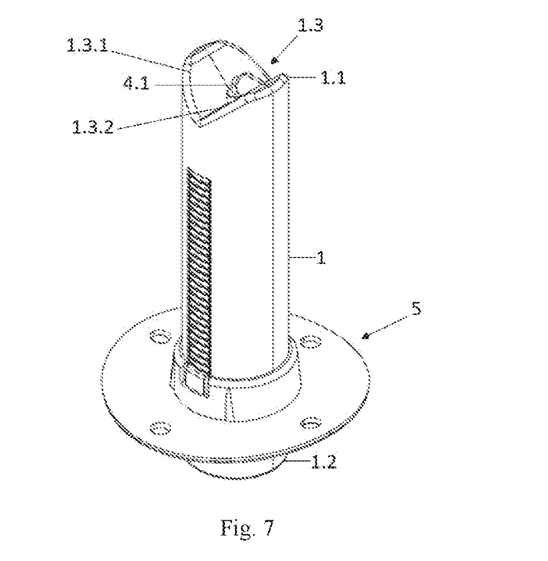
FIG. 7 is a perspective view of the device according to second embodiment of the present invention.
Figure 12:
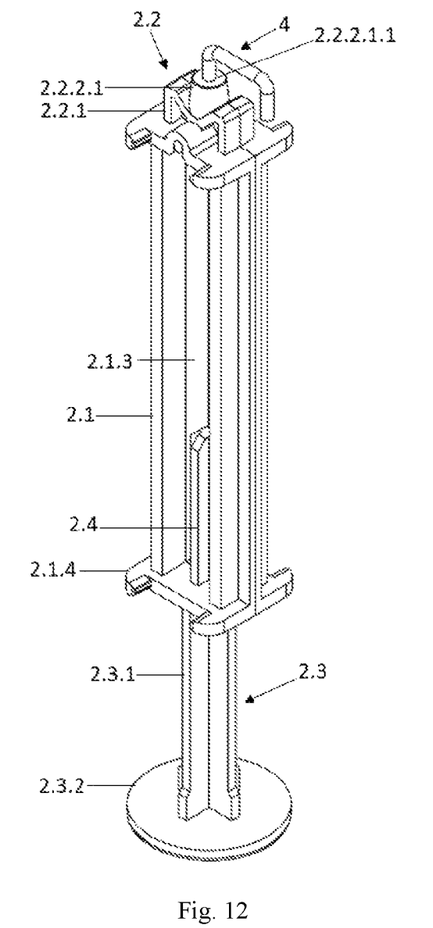
FIG. 12 is a perspective view of the display of the device according to second embodiment of the present invention.
Figure 13:
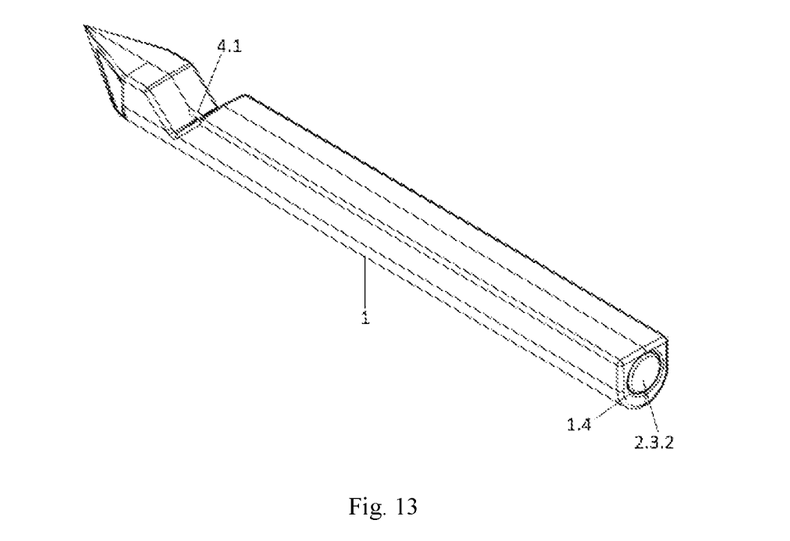
FIG. 13 is a perspective view of the device according to third embodiment of the present invention.

FIGS. 6 and 12 show the display (2) according to the present invention. The display (2) comprises a body (2.1) comprising a proximal end (2.1.1) located proximate to the metal part upon installation of the device, a distal end (2.1.2) located away from the metal part upon installation of the device, an opening (2.1.3) located longitudinally, and a plurality of protrusions (2.1.4) extending transversely at corners of the proximal end (2.1.1) and the distal end (2.1.2), a sensor connecting portion (2.2) comprising a body (2.2.1) connected to the proximal end (2.1.1) of the body (2.1), and a sensor supporting portion (2.2.2) for supporting the sensor (4), a display portion (2.3) comprising a bar (2.3.1) assembled in an extendable manner to the distal end (2.1.2) of the body (2.1), and a flange (2.3.2) connected to an end of the bar (2.3.1), and a spring supporting portion (2.4) extending from an internal surface of the distal end (2.1.2) of the body (2.1) for supporting the spring (3). In a preferred embodiment, the opening (2.1.3) is provided so that the abutting portion (1.6) can be inserted therefrom.

From the above embodiment, the body (2.1) is provided at at least two movement controlling portions (1.5) and the plurality of protrusions (2.1.4) is in contact with at least two movement controlling portions (1.5). Therefore, the body (2.1) is controlled to move in an accurate direction and not diverge from the predetermined direction, which could interrupt the movement.

According to the arrangement of the device of this invention, when the sensor (4) is corroded until it is weakened or broken, the spring (3) provided at the spring supporting portion (2.4) will drive the display portion (2.3) of the display (2) out of the housing (1) until the distal end (2.1.2) or the plurality of protrusions (2.1.4) of the body (2.1) of the display (2) hits the edge of the opening hole (1.4) of the housing (1). Therefore, only the bar (2.3.1) and the flange (2.3.2) of the display portion (2.3) extend from the housing (1) to display the result.

Preferably, the sensor supporting portion (2.2.2) of the sensor connecting portion (2.2) has a shape that fits the opening (1.3.5) of the concave portion (1.3).

In another embodiment, the sensor supporting portion (2.2.2) of the sensor connecting portion (2.2) comprises a first protrusion (2.2.2.1) and a second protrusion (2.2.2.2) extending from the body (2.2.1) at the top, the first protrusion (2.2.2.1) and the second protrusion (2.2.2.2) being inclined toward each other, wherein the end of the first protrusion (2.2.2.1) supports the sensor (4), and the second protrusion (2.2.2.2) comprises a fastening hole (2.2.2.2.1) provided to allow the sensor (4) to be attached to the second protrusion (2.2.2.2).

Further to the above embodiment, the end of the first protrusion (2.2.2.1) supports the corroded portion (4.1) of the sensor (4), which extends horizontally from the inserted portion (1.3.4), allowing the corroded portion (4.1) of the sensor (4) to remain in the horizontal direction more effectively and the fastening hole (2.2.2.2.1) of the second protrusion (2.2.2.2) allows a vertical engagement of the second end (4.3) of the sensor (4) and the display (2).

The sensor supporting portion (2.2.2) of the sensor connecting portion (2.2) may comprise a first protrusion (2.2.2.1) having a fastening hole (2.2.2.1.1) for the sensor (4) to be inserted along a vertical axis. The fastening hole (2.2.2.1.1) for the sensor (4) to be inserted along a vertical axis allows the corroded portion (4.1) of the sensor (4) to be arranged vertically.

According to the above embodiment, both the horizontal and vertical engagement of the second end (4.3) of the sensor (4) with the display (2) allows the display (2) to be arranged in an initial position inside the housing (1). When the corroded portion (4.1) of the sensor (4) is corroded until it is weakened or broken, the display (2) will be pushed out by the force of the spring (3).

Advantageously, the housing (1) further comprises an abutting surface (1.9) provided at a lower side of the concave portion (1.3), and the display (2) further comprises an abutting portion (2.5) provided at a lower side of the first protrusion (2.2.2.1) of the sensor supporting portion (2.2.2) facing outwardly for abutting against the abutting surface (1.9). The abutting portion (2.5) abuts against the abutting surface (1.9) for acting as a point for the display (2) to avoid unbalancing force caused of bending of the corroded portion (4.1) provided horizontally.

Figure 15:
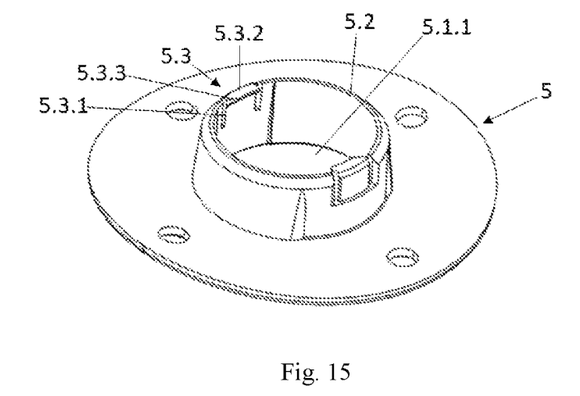
FIG. 15 is a perspective view of an engaging member of the device according to the present invention.

As shown in FIG. 1 5, the device according to this invention may further comprise an engaging member (5) comprising a flange (5.1) having a central opening (5.1.1) for the housing (1) to be inserted, the flange (5.1) accommodating the external surface of an insulation covering the metal part, at least two upward protrusions (5.2) located opposite to each other extending upwardly from an edge of the central opening (5.1.1), and at least two locking protrusions (5.3) located between the upward protrusions (5.2), the locking protrusions (5.3) comprising a protrusion (5.3.1) extending upwardly from the edge of the central opening (5.1.1), an inclined protrusion (5.3.2) located at an end of the protrusion (5.3.1) such that it faces inwardly, with a lower surface inclined upwardly to move past the first inclined portion (1.7.1.1) of the locking bar (1.7) in a direction, and an inclined portion (5.3.3) provided such that it is in contact with the second inclined portion (1.7.1.2) of the locking bar (1.7).

According to the above embodiment, the engaging member (5) allows the housing (1) to engage with the installation area more securely. In addition, rotating the inclined portion (5.3.3) of the engaging member (5) to face the second inclined portion (1.7.1.2) of the locking bar (1.7) will cause both parts to push each other, releasing the engagement of the protrusion (5.3.1) of the engaging member (5) and the first inclined portion (1.7.1.1) of the locking bar (1.7). Therefore, the protrusion (5.3.1) can move past the first inclined portion (1.7.1.1) in another direction, i.e. the housing (1) can be removed from the engaging member (5).

In an exemplanatory embodiment, the sensor (4) is a wire which is made of a composition comprising carbon or alloy. The carbon may be plain carbon steel which is, for example, low carbon steel (<0.2% C), medium carbon steel (0.2-0.5% C) or high carbon steel (>0.5% C). The alloy may be low alloy steel which is, for example, moly steel, chrome steel, weathering steel or high strength low alloy steel.

Another embodiment of the present invention relates to a method for detecting corrosion of a metal part. The method according to this invention comprises installing a device comprising a housing (1) which is a hollow cylinder comprising a proximal end (1.1) located proximate to the metal part upon installation of the device, and a distal end (1.2) located away from the metal part upon installation of the device, a display (2) having at least a part which is located inside the housing (1); a spring (3) located inside the housing (1) in a compressed manner, pushing the display (2) outwardly, and a sensor (4) located in a manner that associates the housing (1) with the display (2), comprising a corroded portion (4.1), wherein the corroded portion (4.1) is located outside the housing (1), and in a same condition with the metal part, and the corroded portion (4.1) of the sensor (4) has a diameter in a range of 0.6 to 1.5 mm.

According to the present invention, the housing (1) is placed perpendicularly to a longitudinal axis of the metal part.

In an embodiment, the corroded portion (4.1) of the sensor (4) is placed transverse to a longitudinal axis of the housing (1). Alternatively, the corroded portion (4.1) of the sensor (4) is placed in a same direction as the longitudinal axis of the housing (1).

The metal part according to this invention can be various objects, such as a pipe or an elongated tube-like object.

In a preferred embodiment, the device of this invention is installed at a lowest portion of the metal part.

The method of this invention may further comprise assembling the housing (1) to an engaging member (5) having a flange (5.1) with a central opening (5.1.1) by inserting the housing (1) into the central opening (5.1.1) to secure the housing (1) with the engaging member (5). The flange (5.1) is accommodating the external surface of an insulation covering metal part. Additionally, the engaging member (5) may further comprise a detach mechanism so that when the housing (1) is rotated, the housing (1) is removed from the installing position. The detachable assembling allows the operator to use the device with ease and remove the device conveniently and quickly.

Hereinafter, a mention will be made to a test which explains the corrosion of the sensor (4) in comparison with test specimens. The test herein will be carried out by adjusting three parameters of the sensor (4) to observe the corrosion characteristics compared with the corrosion of the test specimens. The three parameters consist of the diameter of the sensor (4), the length of the corroded portion (4.1) of the sensor (4), and the distance between the corroded portion (4.1) of the sensor (4) and the surface of the test specimens.

Firstly, a description will be made to a test on a relationship between the corrosion of the corroded portion (4.1) of the sensor (4), which has different diameters and lengths and the corrosion of the test specimens, which are wires and 20×15×3 mm. A36 carbon steel sheets, respectively. The test is carried out by providing wires with different diameters and lengths and a number of such steel sheets; placing one such steel sheet and each wire in each well of an aluminum plate; adding an acetic acid solution with the concentration of 5% by mass to each well of the aluminum plate; and covering each well of the aluminum plate with asbestos insulation. The test for each length is repeated twice for test accuracy. After that, the tester observes the condition of the wires at determined periods. When the wires are broken, the tester will continue to measure the thickness of the steel sheet. The depth of the corroded surface of such steel sheet is deemed to be the depth of the corroded surface of the metal part. The corroded depth of the plate surface represents for corroded pipe surface depth. From the inventor's study, the plate corroded depth can reflect the state of corrosion which is corresponding to maintenance of the metal part, that are:

If the corroded depth is less than 0.75 mm., it can be determined that it is too early to repair the metal part;

If the corroded depth is in a range of 0.75-1.25 mm., it can be determined that it is suitable to repair the metal part; and If the corroded depth is greater than 1.25 mm., it can be determined that it is too late to repair the metal part.

The test results are shown in Table 1 below.

According to Table 1, the "Depth" means the depth of the corroded surface of the steel sheet which represents the depth of the corroded surface of the metal part.

The "State" as shown in Table 1 that is categorized as "E", "O" and "L" represents the determination of various states where the metal part is corroded corresponding to the aforementioned corrosion depth which effects to maintenance of the metal part. The state "E" is designated in the Table 1 when the corroded depth of the steel sheet is less than 0.75 mm., the state "O" is when the corroded depth is in the range of 0.75-1.25 mm. and the state "L" is when the corroded depth is greater than 1.25 mm.

TABLE 1

| Wire length (mm.) | Wire Diameter (mm.) | | | | | | | | | | |
|---|---|---|---|---|---|---|---|---|---|---|---|
| | 0.5 | | 0.6 | | 0.7 | | 0.8 | | 0.9 | | 1 |
| | Depth | State | Depth | State | Depth | State | Depth | State | Depth | State | Depth |
| 1 | 0.66 | E | 0.7 | E | 0.72 | E | 0.99 | O | 1.24 | O | 1.5 |
| 1 | 0.63 | E | 0.83 | O | 0.81 | O | 0.85 | O | 1.1 | O | 1.2 |
| 2 | 0.55 | E | 0.75 | O | 0.83 | O | 0.83 | O | 0.95 | O | 1.13 |
| 2 | 0.56 | E | 0.79 | O | 0.88 | O | 0.88 | O | 1.2 | O | 1.09 |
| 3 | 0.49 | E | 0.81 | O | 0.57 | E | 0.77 | O | 0.89 | O | 0.93 |
| 3 | 0.59 | E | 0.88 | O | 0.69 | E | 0.67 | E | 0.95 | O | 1.02 |
| 4 | 0.62 | E | 0.56 | E | 0.78 | O | 0.64 | E | 0.85 | O | 0.95 |

TABLE 1-continued

| | | | | | | | | | | |
|---|---|---|---|---|---|---|---|---|---|---|
| 4 | 0.64 | E | 0.65 | E | 0.56 | E | 0.59 | E | 0.88 | O | 1.05 |
| 5 | 0.55 | E | 0.62 | E | 0.72 | E | 0.6 | E | 0.87 | O | 0.81 |
| 5 | 0.46 | E | 0.7 | E | 0.6 | E | 0.71 | E | 0.69 | E | 0.89 |
| 6 | 0.35 | E | 0.76 | O | 0.66 | E | 0.55 | E | 0.73 | E | 0.67 |
| 6 | 0.5 | E | 0.77 | O | 0.66 | E | 0.61 | E | 0.65 | E | 0.81 |
| 8 | 0.48 | E | 0.59 | E | 0.62 | E | 0.65 | E | 0.78 | O | 0.84 |
| 8 | 0.3 | E | 0.71 | E | 0.72 | E | 0.68 | E | 0.52 | E | 0.76 |
| 10 | 0.49 | E | 0.67 | E | 0.63 | E | 0.76 | O | 0.71 | E | 0.78 |
| 10 | 0.51 | E | 0.62 | E | 0.7 | E | 0.73 | E | 0.88 | O | 0.8 |
| 12 | 0.44 | E | 0.33 | E | 0.68 | E | 0.67 | E | 0.62 | E | 0.63 |
| 12 | 0.33 | E | 0.67 | E | 0.65 | E | 0.56 | E | 0.75 | O | 0.87 |
| 15 | 0.33 | E | 0.5 | E | 0.68 | E | 0.45 | E | 0.79 | O | 0.77 |
| 15 | 0.11 | E | 0.49 | E | 0.5 | E | 0.55 | E | 0.74 | E | 0.95 |
| 20 | 0.16 | E | 0.35 | E | 0.39 | E | 0.39 | E | 0.72 | E | 0.73 |
| 20 | 0.2 | E | 0.34 | E | 0.45 | E | 0.86 | O | 0.68 | E | 0.67 |
| 30 | 0.11 | E | 0.33 | E | 0.48 | E | 0.52 | E | 0.55 | E | 0.65 |
| 30 | 0.15 | E | 0.5 | E | 0.49 | E | 0.45 | E | 0.66 | E | 0.59 |

| Wire length (mm.) | Wire Diameter (mm.) | | | | | | | | | |
|---|---|---|---|---|---|---|---|---|---|---|
| | 1 | | 1.1 | | 1.2 | | 1.3 | | 1.4 | | 1.5 | |
| | Depth | State | Depth | State | Depth | State | Depth | State | Depth | State |
| 1 | | L | 1.32 | L | 1.56 | L | 1.73 | L | 1.56 | L | 1.88 | L |
| 1 | | O | 1.26 | L | 1.34 | L | 1.6 | L | 1.84 | L | 2.1 | L |
| 2 | | O | 0.98 | O | 1.3 | L | 1.63 | L | 1.72 | L | 1.84 | L |
| 2 | | O | 1.22 | O | 1.2 | O | 1.57 | L | 1.75 | L | 1.76 | L |
| 3 | | O | 0.99 | O | 1.12 | O | 1.38 | L | 1.45 | L | 1.63 | L |
| 3 | | O | 1.15 | O | 1.25 | O | 1.31 | L | 1.39 | L | 1.67 | L |
| 4 | | O | 0.99 | O | 1.33 | L | 1.22 | O | 1.52 | L | 1.74 | L |
| 4 | | O | 0.91 | O | 0.95 | O | 1.01 | O | 1.56 | L | 1.65 | L |
| 5 | | O | 0.88 | O | 0.88 | O | 0.83 | O | 1.32 | L | 1.56 | L |
| 5 | | O | 0.72 | E | 0.86 | O | 0.74 | E | 1.44 | L | 1.55 | L |
| 6 | | E | 0.83 | O | 0.8 | O | 1.6 | L | 1.56 | L | 1.42 | L |
| 6 | | O | 0.87 | O | 0.77 | O | 1.2 | O | 1.38 | L | 1.34 | L |
| 8 | | O | 0.67 | E | 0.79 | O | 1.39 | L | 0.95 | O | 1.45 | L |
| 8 | | O | 0.79 | O | 0.61 | E | 1.4 | L | 1.31 | L | 1.48 | L |
| 10 | | O | 0.73 | E | 0.75 | O | 1.15 | O | 0.89 | O | 1.54 | L |
| 10 | | O | 0.76 | O | 0.8 | O | 1.3 | L | 1.22 | O | 1.41 | L |
| 12 | | E | 0.65 | E | 0.73 | E | 0.85 | O | 1.28 | L | 1.3 | L |
| 12 | | O | 0.73 | E | 0.77 | O | 0.99 | O | 1.09 | O | 1.38 | L |
| 15 | | O | 0.87 | O | 0.56 | E | 0.66 | E | 1.1 | O | 1.25 | O |
| 15 | | O | 0.8 | O | 1.03 | O | 0.55 | E | 0.87 | O | 1.06 | O |
| 20 | | E | 0.82 | O | 0.79 | O | 1.02 | O | 0.88 | O | 1.15 | O |
| 20 | | E | 0.65 | O | 0.88 | O | 0.76 | O | 0.93 | O | 1.76 | L |
| 30 | | E | 0.66 | E | 0.75 | O | 0.81 | O | 0.7 | E | 1.06 | O |
| 30 | | E | 0.62 | E | 0.77 | O | 0.67 | E | 1.05 | O | 0.98 | O |

According to the testing results of Table 1, it is shown that the wire lengths in the range of 1-30 mm. can provide the optimal detection state (shown as "O" state in the table). Further, the wire diameters in the range of 0.6-1.5 mm. can also provide the optimal detection state. These ranges of wire lengths and diameters provide advantages that the maintenance of the metal part can be performed in suitable period, not too early which leads to higher cost and time consuming and not too late which leads to damages of the metal part and other devices. Especially, the wire diameters in the range of 1-1.2 mm. significantly shows a large numbers of optimal detection states.

From the above testing result, it can prove that the detection device comprising the corroded portion (4.1) with the diameter and length in the above-specified ranges allows accuracy in the detection of the metal part corrosion.

Next, a description will be made to a test on a relationship between the corrosion of the wires located away from the surface of the test specimens at different distances and the corrosion of the test specimens. The apparatus and device for the test consist of a 6-ring specimen (which is the test tube divided into six parts by TPFE); a set of wires located away from the surface of the test tubes at different distances; a thermal insulation wrapping around the test tube such that there are a gap, which is 6.4 mm away from the surface of the test tube, and a flow channel for fluid; a solution of NaCl (100 ppm) in $H_2SO_4$; a pump that circulates the solution past the surface of the test tube through a flow channel; and a set of temperature controllers inside the tube which includes the oil in the tube and a heater for controlling the oil temperature. The test is carried out by circulating the solution through the flow channel at a flow rate of 5 ml/min and switching the oil temperature between 150° C. and 60° C. every 24 hours. Afterwards, the tester observes the condition of the wires. When the wires are broken, the tester will continue to measure the depth of the corroded test tube. The test result is shown below in Table 2. The "State" as shown in Table 2 is the same meaning as described above. The "Depth" means the depth of the corroded surface of the steel sheet which represents the depth of the corroded surface of the metal part.

TABLE 2

| Wire Position | Gap (mm.) | Normal Mass (g) | Fail mass (g) | Different (g) | Depth (mm) | State |
|---|---|---|---|---|---|---|
| No. 1 | 20 | 1.6199 | 1.5532 | 0.0667 | 0.42 | E |
| No. 2 | 15 | 1.6544 | 1.5533 | 0.1011 | 0.54 | E |

TABLE 2-continued

| Wire Position | Gap (mm.) | Normal Mass (g) | Fail mass (g) | Different (g) | Depth (mm) | State |
|---|---|---|---|---|---|---|
| No. 3 | 10 | 1.6655 | 1.5278 | 0.1377 | 0.69 | E |
| No. 4 | 9 | 1.6702 | 1.5299 | 0.1403 | 0.61 | E |
| No. 5 | 8 | 1.6233 | 1.4791 | 0.1442 | 0.83 | O |
| No. 6 | 7 | 1.6344 | 1.4811 | 0.1533 | 0.92 | O |
| No. 7 | 6 | 1.7201 | 1.5735 | 0.1466 | 1.05 | O |
| No. 8 | 5 | 1.5955 | 1.4328 | 0.1627 | 1.11 | O |
| No. 9 | 4 | 1.6892 | 1.514 | 0.1752 | 1.23 | O |
| No. 10 | 3 | 1.5866 | 1.3983 | 0.1883 | 1.6 | L |
| No. 11 | 2 | 1.7651 | 1.5607 | 0.2044 | 2.1 | L |
| No. 12 | 1 | 1.6899 | 1.4343 | 0.2556 | 2.36 | L |

According to testing results of Table 2, it is clearly seen that when the gap between the wire and the surface of the test tube is in the range of 4-8 mm. (Wire Position No. 5-9), the corrosions of the test tubes are in optimal ("O") state meaning that it is a suitable period to repair the metal part. If the gap between the wire and the surface of the test tube is too wide, such as the Wire Position No. 1-4 that the gap is greater than 8 mm., the corrosions tend to occur too low as such it is too early to repair the metal part. This can lead to higher cost and time consuming to the maintenance of the metal part. In contrast, if the gap between the wire and the surface of the test tube is too narrow, such as the Wire Position No. 10-12 that the gap is less than 4 mm., the corrosions tend to occur too high and it is too late to repair the metal part. This can cause damages to the metal part and other devices.

The device and method for detecting corrosion according to the present invention are not limited to the embodiments described above or in the drawings. The present invention is capable of other embodiments and being modified or changed in different ways to provide the same results of the invention. Such modifications or changes are considered to be within the concept and scope of the present invention.

THE MOST PREFERRED EMBODIMENT OF THE INVENTION

As disclosed in the detailed description.

The invention claimed is:

1. A device for detecting corrosion of a metal part comprising
   a housing which is a hollow cylinder comprising a proximal end located proximate to the metal part upon installation of the device, and a distal end located away from the metal part upon installation of the device;
   a display having at least a part which is located inside the housing;
   a spring located inside the housing in a compressed manner, pushing the display outwardly; and
   a sensor located in a manner that associates the housing with the display, comprising a corroded portion located outside the housing,
   wherein the corroded portion of the sensor has a diameter in a range of 0.6 to 1.5 mm and wherein the housing further comprises
   at least two movement controlling portions which are located opposite to each other, each having at least two ridges extending longitudinally from an internal surface of the housing; and
   an abutting portion including a receiving portion located at the internal surface of the housing and a bar located opposite to the receiving portion extending from the internal surface of the housing to the receiving portion for supporting the pushing of the spring.

2. The device according to claim 1, wherein the corroded portion of the sensor has a length in a range of 1 to 30 mm.

3. The device according to claim 1, wherein the corroded portion of the sensor is positioned in a range of 4 to 8 mm away from the proximal end of the housing or a plane of an external surface of the housing that is closest to the metal part.

4. The device according to claim 1, wherein the sensor further comprises a first end attached to the housing and a second end attached to the display in a manner that the display being attached in an initial position inside the housing upon installation of the device and is at least partially pushed out of the housing when the corroded portion of the sensor is corroded until it is weakened or broken.

5. The device according to claim 1, wherein the corroded portion of the sensor is placed transverse to a longitudinal axis of the housing.

6. The device according to claim 1, wherein the corroded portion of the sensor is placed in a same direction as the longitudinal axis of the housing.

7. The device according to claim 1, wherein the housing further comprises
   a concave portion being formed of a first extending portion and a second extending portion which extend downwardly and converge each other to form the concave portion from the proximal end or from the side wall of the housing for supporting the corroded portion of the sensor;
   an opening hole located at the distal end.

8. The device according to claim 7, wherein the concave portion further comprises
   a fastening hole provided to be attached to the sensor;
   an inserted portion located at the first extending portion to allow the corroded portion of the sensor to come outside; and
   an opening located at a lower side of the concave portion for supporting an end of the display.

9. The device according to claim 8, wherein the inserted portion is a hole located at the first extending portion, or a hollow protrusion extending horizontally from the first extending portion.

10. The device according to claim 1, wherein the housing further comprises a locking bar, which comprises a plurality of locking slits located at an external surface of the housing, with a first inclined portion inclined downwardly toward the distal end of the housing and a second inclined portion inclined toward a lateral side of the locking slits.

11. The device according to claim 1, wherein the display comprises
   a body comprising a proximal end located proximate to the metal part upon installation of the device, a distal end located away from the metal part upon installation of the device, an opening located longitudinally, and a plurality of protrusions extending transversely at corners of the proximal end and the distal end;
   a sensor connecting portion comprising a body connected to the proximal end of the body, and a sensor supporting portion for supporting the sensor;
   a display portion comprising a bar assembled in an extendable manner to the distal end of the body, and a flange connected to an end of the bar; and
   a spring supporting portion extending from an internal surface of the distal end of the body for supporting the spring.

12. The device according to claim 11, wherein the sensor supporting portion of the sensor connecting portion of the display comprises a first protrusion and a second protrusion extending from the body of the sensor connecting portion at the top, the first protrusion and the second protrusion being inclined toward each other, wherein the end of the first protrusion supports the sensor, and the second protrusion comprises a fastening hole provided to allow the sensor to be attached to the second protrusion.

13. The device according to claim 11, wherein the sensor supporting portion of the sensor connecting portion comprises a first protrusion having a fastening hole for the sensor to be inserted along a vertical axis.

14. The device according to claim 7, wherein the housing further comprises an abutting surface provided at a lower side of the concave.

15. The device according to claim 1 further comprises an engaging member comprising
- a flange having a central opening for the housing to be inserted, the flange accommodating the external surface of an insulation covering the metal part;
- at least two upward protrusions located opposite to each other extending upwardly from an edge of the central opening; and
- at least two locking protrusions located between the upward protrusions, the locking protrusions comprising a protrusion extending upwardly from the edge of the central opening, an inclined protrusion located at an end of the protrusion such that it faces inwardly, with a lower surface inclined upwardly to move past the first inclined portion of the locking bar in a direction, and an inclined portion provided such that it is in contact with the second inclined portion of the locking bar.

16. The device according to claim 1, wherein the sensor is a wire which is made of a composition comprising carbon or alloy.

17. The device according to claim 12, wherein the display further comprises an abutting portion provided at a lower side of the first protrusion of the sensor supporting portion facing outwardly for abutting against the abutting surface.

18. A method for detecting corrosion of a metal part comprising installing a device comprising
- a housing which is a hollow cylinder comprising a proximal end located proximate to the metal part upon installation of the device, and a distal end located away from the metal part upon installation of the device;
- a display having at least a part which is located inside the housing;
- a spring located inside the housing in a compressed manner, pushing the display outwardly; and
- a sensor located in a manner that associates the housing with the display, comprising a corroded portion, wherein the corroded portion is located outside the housing, and in a same condition with the metal part, and the corroded portion of the sensor has a diameter in a range of 0.6 to 1.5 mm wherein the housing further comprises
- at least two movement controlling portions which are located opposite to each other, each having at least two ridges extending longitudinally from an internal surface of the housing; and
- an abutting portion including a receiving portion located at the internal surface of the housing and a bar located opposite to the receiving portion extending from the internal surface of the housing to the receiving portion for supporting the pushing of the spring.

19. The method according to claim 18 wherein the housing is placed perpendicularly to a longitudinal axis of the metal part.

20. The method according to claim 18, wherein the corroded portion of the sensor is placed transverse to a longitudinal axis of the housing.

21. The method according to claim 18, wherein the corroded portion of the sensor is placed in a same direction as the longitudinal axis of the housing.

22. The method according to claim 18, wherein the metal part is a pipe or an elongated tube-like object.

23. The method according to claim 18, wherein the device is installed at a lowest portion of the metal part.

24. The method according to claim 18 further comprises assembling the housing to an engaging member having a flange with a central opening by inserting the housing into the central opening to secure the housing with the engaging member, wherein the flange is accommodating the external surface of an insulation covering metal part.

25. The method according to claim 24, wherein the engaging member further comprises a detach mechanism so that when the housing is rotated, the housing is removed from the installing position.

* * * * *